April 5, 1966 D. B. BROWN 3,244,328
DISPENSING FROM PLURAL SOURCES
Filed March 23, 1964
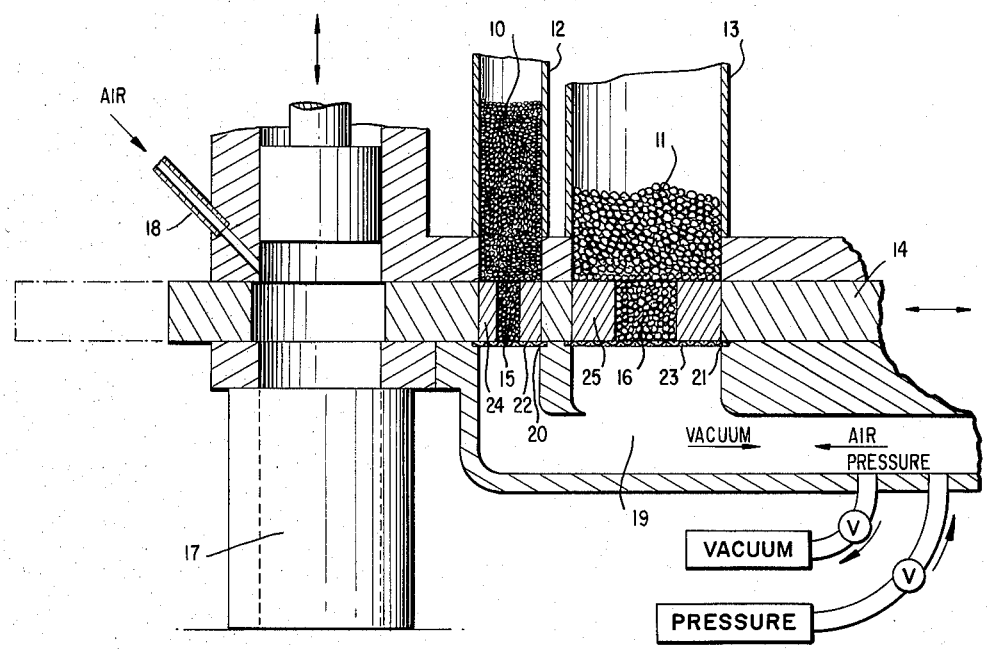
INVENTOR.
DELOS B. BROWN
BY
Sughrue, Rothwell, Mion & Zinn
ATTORNEYS

United States Patent Office 3,244,328
Patented Apr. 5, 1966

3,244,328
DISPENSING FROM PLURAL SOURCES
Delos B. Brown, Big Flats, N.Y., assignor to Corning Glass Works, Corning, N.Y., a corporation of New York
Filed Mar. 23, 1964, Ser. No. 353,716
5 Claims. (Cl. 222—136)

My invention relates to dispensing from plural sources, and more particularly, dispensing discrete quantities of various materials from multiple sources by means of a number of movable trap chambers.

The use of movable trap chambers to meter and dispense various materials is well known in the art. Typically, prior art systems employing movable trap chambers have provided a carrying member for a trap chamber, a source of material, a trap chamber, and a delivery location. Dispensing of material from the source was accomplished by moving the trap chamber to a point adjacent the source, filling the trap chamber, moving the trap chamber to the delivery location, and emptying the trap chamber. At any time the trap chamber was moved beneath a source container of material, in a system employing gravitational feed from a source, the trap chamber would be filled.

In the few instances in which metered dispensing of multiple materials was desired, the prior art employed one of two approaches. Either a number of movable members were provided, in order to permit use of a number of individual trap chambers which must be separately operated, or a single movable member with multiple trap chambers was used. In the event that the latter alternative was selected, careful provision was made to assure that each trap chamber would move only between its individual source of material to be dispensed and a single delivery location. These approaches were necessary in order to assure that mixture of the material being dispensed from the multiple sources did not occur in the trap chambers, and in order to assure that the trap chambers were filled from only a single source of supply.

Thus, it may be seen that prior art dispensing systems designed to dispense multiple materials frequently required a multiplicity of movable members or a variety of tortuous passages, thus greatly complicating all metering and dispensing apparatus.

My invention corrects the deficiencies of prior art systems for dispensing from multiple sources by permitting the use of a single movable member which carries a number of trap chambers, with each trap chamber dispensing material only from its single, desired, associated source.

It is an object of this invention to provide an improved apparatus for dispensing materials from multiple sources.

It is a further object of this invention to provide an improved dispensing apparatus of the type employing movable trap chambers which permits dispensing materials from multiple sources.

A further object of this invention is to provide an improved dispensing apparatus of the type employing movable trap chambers in which discharge controls assure that each trap chamber receives materials only from a desired source.

Briefly, my invention embodies the use of a single movable element having at least two trap chambers and movable between a material receiving position and a material delivery position. The trap chambers are so positioned and the movable element moves in such a manner that the trap chambers pass successively adjacent at least one material receiving location in moving from the material delivery position to the material receiving position. Discharge controls operate to prevent movement of material from the source associated with that material receiving location into the trap chambers until such time as the movable member shall have reached the material receiving position.

Other objects of the invention will be pointed out in the following description and claims and illustrated in the accompanying drawing, which discloses, by way of example, the principle of the invention and the best mode which has been contemplated of applying that principle. In the drawing:

The single figure is a side view, in section with the fluid system shown schematically.

The particular embodiment chosen to be illustrated in the drawing, and which will be described in detail here, applies a dispensing apparatus embodying my invention to the feeding of a bead material into a mold for a molding operation. Two varieties of materials are employed, which may be polystyrene beads 10 of a high density, and polystyrene beads 11 of a low density. These materials are normally received within storage hoppers 12, 13, from which the material may be gravity fed into the dispensing apparatus of my invention.

In order to transfer the material from the storage hoppers into the mold, I provide a movable member in the form of a reciprocating slide 14 having two trap chambers 15, 16. The slide member 14 may be reciprocated by any suitable means (not shown) between two extreme positions. The slide member 14 is illustrated, in FIG. 1, in one extreme position, at which the trap chambers 15, 16 are positioned below the storage hoppers 12, 13 in order to receive and measure quantities of the materials 10, 11, in the storage hoppers. As the slide member 14 is reciprocated to a second extreme position, by being moved to the left in FIG. 1, the trap chambers 15, 16 are successively positioned over a mold cavity 17 which is to receive the polystyrene beads 10, 11. As may be understood, the trap chamber 15 located closest to the mold chamber 17 is the first trap chamber located over the material delivery position into the mold 17 as the slide member 14 moves toward the second extreme position. The second trap chamber 16 is brought into the material delivery position subsequent to the clearing of all material from the first trap chamber 15.

While not essential to the practice of my invention, I provide an auxiliary jet 18 located above the slide member 14 and mounted to direct a blast of air into the top side of the trap chambers as they reach the material delivery position. In this manner, I assure that all material carried by the trap chamber is emptied into the mold 17.

During the movement of the slide member 14 from the first extreme position, at which the trap chambers 15, 16 are filled with material from the storage hoppers 12, 13, toward the second extreme position in which the trap chambers have emptied into the mold 17, the second trap chamber 16 is filled with material 11. As a result, none of the material 10 contained in the first storage hopper 12 may be received within the second trap chamber 16. In this manner, mixing of the two materials within the trap chambers is avoided, and metered quantities of both materials, determined by the volume of the trap chambers, may be introduced into the mold 17. In moving the slide member 14 from the second extreme position back to the first extreme position, that is in moving it to the right in FIG. 1, the second trap chamber 16 must pass beneath the first storage hopper 12 while empty. In prior art devices, this second trap chamber 16 would be immediately filled by gravity flow of material 10 from the first storage hopper 12. Thus, when the second trap chamber 16 was brought into the desired loading position beneath the second storage hopper 13, the trap chamber 16 would be full and could not receive material 11 from the second storage hopper 13.

In order to permit filling the second trap chamber 16 only with material 11 from the second storage hopper 13, my invention provides a discharge control over removal of material from the storage hoppers 12, 13 until such time as the slide member 14 has reached the first extreme position and the trap chambers 15 and 16 are properly positioned beneath their associated storage hoppers 12, 13. More specifically, my invention provides that material from the first storage hopper 12 will not be permitted to flow, under gravitational forces, into the second trap chamber 16, as that trap chamber moves beneath the storage hopper 12 toward the first extreme position of the slide member 14. This is accomplished by providing a manifold 19 adjacent the slide member 14. This manifold 19 opens against the side of the slide member opposite the storage hoppers 12, 13 and has openings 20, 21 corresponding to storage hoppers 12, 13, respectively. These openings 20, 21 are closed, adjacent slide member 14, by screen elements 22, 23 which are foraminous so as to transmit fluid pressures but not permit flow of the materials 10, 11 stored in the hoppers 12, 13.

Air pressure or vacuum may be applied from any suitable fluid system (such as that shown schematically in the drawing) to the manifold 19 in order to control flow of the materials 10, 11 in the storage hoppers 12, 13. Thus, as the slide member 14 returns to the first extreme position from the second extreme position, moving toward the right in FIG. 1, air pressure is applied to manifold 19. As the second trap chamber 16 moves beneath the first storage hopper 12, the air pressure within the manifold 19 acts through the screen 22 to prevent gravitational flow of the material 10 into the trap chamber 16. As a result, the second trap chamber 16 may be kept free from any material until such time as it reaches the proper position to receive material 11 from the associated second storage hopper 13.

When the slide member 14 reaches the second extreme position, as illustrated in FIG. 1, the air pressure within the manifold 19 may act through the screen 23 to prevent gravitational flow of the material 11 in the second storage hopper 13 into the second trap chamber 16. In a similar manner, the pressure within the manifold 19 may prevent flow of the material 10 in the first storage hopper 12 into the first trap chamber 15. When it is desired to fill the trap chambers 15, 16 with material in order to begin another measuring and dispensing operation, the air pressure within the manifold may be relieved or released. Then, if the materials 10, 11 are of sufficient weight, gravitational flow of the materials will fill the trap chambers 15, 16. If it is desired to increase the speed of filling the trap chambers from the supply hoppers or if the materials in the supply hoppers do not have sufficient weight to easily fill the trap chambers by gravitational flow alone, a vacuum may be applied to the manifold 19. Such a vacuum, or lowered pressure, would operate through the screens 22, 23 to draw materials 10, 11 into the trap chambers 15, 16.

As may be understood, the trap chambers provide measuring volumes for the materials 10, 11 to be dispensed from the storage hoppers 12, 13. The particular volume of material to be dispensed is determined by the size of the trap member 15, 16 contained between the lower limiting surface provided by the screens 22, 23 and the upper surface of the slide member 14. In various applications of the dispensing apparatus of my invention, it may well be desirable to provide for variations of the quantities of materials dispensed. Accordingly, I provide insert rings 24, 25 which may be received within openings in the slide member 14 and provide trap chambers 15, 16 of varying volume. Changing the volume of the trap chamber thus becomes merely a matter of changing the insert ring.

While the dispensing apparatus of my invention has been described with regard to one particular embodiment, in which a polystyrene bead material is to be dispensed from two supply hoppers, it should be understood that various modifications may be made without exceeding the scope of my invention. Thus, it might well be obvious to employ more than two supply hoppers, with an equal number of movable trap chambers carried by a slide member. Further, the reciprocating slide member might be replaced by some other movable member having a different type of motion, such as a wheel member having trap chambers spaced along its circumference. While this description has suggested the use of air as a fluid control medium, it might well be found preferable to employ some other fluid or some mechanical equivalent means. Naturally, this invention may be applied to any material suitable for measuring and dispensing by a movable trap chamber system. As all these variations may properly come within the scope of my invention, the limits of the invention should be determined only from the appended claims.

What is claimed is:

1. An apparatus for dispensing multiple materials comprising: at least two source chambers for materials to be dispensed, a reciprocating slide member movable between two extreme positions, said slide member having at least one trap chamber for each of said source chambers, each of said trap chambers receiving material from one of said source chambers when said slide member is in a first position, a material receiving member, said trap chambers discharging successively into said material receiving member as said movable member moves from said first position to the other of said two extreme positions, and discharge control means comprising a manifold adjacent said reciprocating member through which fluid pressure may be applied to material within said source chambers to prevent transfer.

2. An apparatus as defined in claim 1 in which: said manifold opens against said reciprocating member opposite said source chambers, and fluid pressure may be applied to material within said source chambers through said trap chambers.

3. An apparatus for dispensing multiple materials comprising: at least two source chambers for materials to be dispensed, a reciprocable slide member movable between two extreme positions, said slide member having a trap chamber for each of said source chambers, each of said trap chambers receiving material from one of said source chambers when said slide member is in a first extreme position, a material delivery chamber, said trap chambers discharging successively into said material delivery chamber as said slide member moves from said first extreme position to a second extreme position and a manifold adjacent said slide member and opening against the side of said slide member opposite said source chambers, means applying fluid pressure through said manifold and said trap chamber to material within said source chambers to prevent transfer of material from said source chambers to said trap chambers until said reciprocable slide member returns to said first extreme position.

4. An apparatus as defined in claim 3 further comprising: means applying vacuum through said manifold and said trap chambers when said slide member is in said first extreme position to assist in transfer of material from said source chambers to said trap chambers.

5. An apparatus for dispensing multiple materials comprising: at least two spaced apart source chambers for materials to be dispensed, a reciprocating slide member movable between two extreme positions, said slide member including two spaced apart trap chambers, the trap chambers being spaced apart in the slide member a distance equal to the space between the source chambers, said trap chambers simultaneously receiving materials from said source chambers when said slide member is in a first position, a material receiving member positioned on the same side of both source chambers so that said trap chambers will discharge successively into the material receiving member as said movable slide member moves from said first position to a second position, and means for applying fluid pressure to material in the source chamber nearest the receiving member to prevent transfer of material to the trap chambers during the return movement of the movable member from said second position to said first position.

References Cited by the Examiner

UNITED STATES PATENTS

| | | | |
|---|---|---|---|
| 780,680 | 1/1905 | Peterson et al. | 222—137 |
| 1,052,654 | 2/1913 | Crowley | 222—194 |
| 1,286,881 | 12/1918 | Gray | 222—137 |
| 1,605,832 | 11/1926 | Garhart | 222—137 X |
| 2,670,878 | 3/1954 | Curry | 222—137 |
| 2,766,911 | 10/1956 | Greaves et al. | 222—194 X |
| 2,935,233 | 5/1960 | Vogt | 141—1 X |
| 3,058,498 | 10/1962 | Vogt | 141—5 |
| 3,106,947 | 8/1963 | Logan | 141—107 |

RAPHAEL M. LUPO, *Primary Examiner.*